United States Patent [19]

Ashida et al.

[11] Patent Number: 5,349,013
[45] Date of Patent: Sep. 20, 1994

[54] PROCESS FOR PRODUCTION OF STYRENE-BASED RESIN COMPOSITION

[75] Inventors: Takashi Ashida; Yoshinori Sato, both of Ichihara, Japan

[73] Assignee: Idemitsu Petrochemical Co., Ltd., Tokyo, Japan

[21] Appl. No.: 123,589

[22] Filed: Sep. 17, 1993

Related U.S. Application Data

[63] Continuation of Ser. No. 603,894, Oct. 25, 1990, abandoned.

[30] Foreign Application Priority Data

Nov. 20, 1989 [JP] Japan ................... 1-301292

[51] Int. Cl.$^5$ ............................... C08L 51/04
[52] U.S. Cl. ........................ 525/53; 525/98; 525/243; 525/314; 525/315
[58] Field of Search .............. 525/53, 98, 243, 314, 525/315

[56] References Cited

U.S. PATENT DOCUMENTS

| | | | |
|---|---|---|---|
| 4,485,210 | 11/1984 | Weiditch et al. | 525/53 |
| 4,839,418 | 6/1989 | Schwaben et al. | 525/53 |
| 4,952,627 | 8/1990 | Morita et al. | 525/52 |
| 5,194,491 | 3/1993 | Sakita et al. | 525/53 |
| 5,231,142 | 7/1993 | Tsubokura | 525/316 |

FOREIGN PATENT DOCUMENTS

| | | |
|---|---|---|
| 4017281 | 12/1990 | Fed. Rep. of Germany . |
| 60-57443 | 12/1985 | Japan . |
| 1063603 | 3/1967 | United Kingdom . |

*Primary Examiner*—John Kight, III
*Assistant Examiner*—Shelley A. Dodson
*Attorney, Agent, or Firm*—Frishauf, Holtz, Goodman & Woodward

[57] ABSTRACT

A process for producing a rubber-modified styrene-based resin. The process includes supplying a styrene-based monomer solution containing 5 to 20% by weight of a rubber component containing a styrene-butadiene-based block polymer rubber with a styrene content of 20 to 50% by weight to a first polymerization zone where initial polymerization is conducted to a conversion of 10 to 30%, and then supplying the resulting initial polymerization solution to a second polymerization zone where polymerization is conducted to a conversion of 30 to 70%, while at the same time phase inversion is caused, thereby controlling a rubber particle diameter to a range of 0.2 to 1.5 μm and an area average rubber particle diameter/number average rubber particle diameter ratio (Ds/Dn) to not more than 2.5. The process results in ease of removal of polymerization heat, reduced power for agitation and does not require a high strength apparatus. The rubber-modified styrene-based resin obtained by the process has a high impact strength, and excellent gloss and stiffness.

16 Claims, No Drawings

5,349,013

PROCESS FOR PRODUCTION OF STYRENE-BASED RESIN COMPOSITION

This application is a continuation, of application Ser. No. 07/603,894, filed Oct. 25, 1990 now abandoned.

BACKGROUND OF THE INVENTION

1. Field of the Invention

The present invention relates to a process for production of rubber-modified styrene-based resins. More particularly, it is concerned with a process for producing rubber-modified styrene-based resins which are excellent in a physical balance; for example, have a high impact strength, and further excellent gloss and stiffness, and thus which are suitable as materials for production of office automation (OA) devices, home electric appliances, car parts, and so forth.

2. Background Information

Rubber-modified styrene-based resins are widely used in various fields because they are excellent in impact resistance and stiffness, and have good moldability. As these rubber-modified styrene-based resins, polybutadiene rubber and styrene-butadiene copolymer rubber have heretofore been generally used.

In order to exhibit the excellent physical properties of gloss and impact strength of rubber-modified styrene-based resins, it is necessary to control the rubber particle diameter to the optimum range and to provide a narrow particle size distribution. In the case of polybutadiene rubber, since a phase transition (transition of a rubber phase from a continuous phase to a dispersion phase) at which rubber particles are formed occurs in an unstable region in the initial stage of polymerization at which the conversion of monomer is 5 to 15%, uniform mixing is needed, and in order to exhibit the gloss, it is necessary to control the rubber particle diameter to 0.5 to 1.5 μm. For these reasons, it is necessary to employ a full mixing vessel-type reactor which is able to provide a high shearing force.

Use of such full mixing vessel-type reactors, however, has disadvantages in that the rubber particle size distribution is broadened and it is difficult to maintain a balance between gloss and impact strength. Thus it is considered that the phase transition in a system using polybutadiene rubber is caused by the use of a column-type reactor having a high plug flow, for example. In this case, however, high speed agitation providing a high shearing force is needed. In this agitation, it is required that in order to increase heat removal efficiency, a multi-plate reactor is used, and a heat conducting tube is passed through plates. Thus the above high speed agitation has disadvantages in that vibration of a stirring blade readily occurs, it is therefore necessary to increase the strength of the heat conducting tube, and in that a power neck is readily produced because of a high viscosity system.

In order to solve the above problems, it is considered to use a styrene-butadiene block copolymer rubber having a styrene content of at least 50% as used in Japanese Patent Publication No. 57433/1985.

This method, however, has disadvantages in that an interface tension with a polystyrene matrix is excessively decreased and thus even under a low shearing force, the rubber particle size is decreased, and the impact strength is extremely low although the gloss is very good.

In order to optimize the particle diameter in the above system, it is necessary to operate a column-type reactor while agitating at a very low speed. In this case, however, problems arise in removal of polymerization heat and insufficient agitation.

SUMMARY OF THE INVENTION

The present invention is intended to overcome the problems of the conventional process for production of rubber-modified styrene-based resins, and the object of the present invention is to provide a process for production of rubber-modified styrene-based resins having excellent physical properties such that impact strength is high, and gloss and stiffness are good, which process permits easy removal of polymerization heat, needs only small power in agitation and so on, and does not require high strength apparatus.

As a result of investigations, it has been found that the above object can be attained by using as a rubber component a styrene-butadiene-based copolymer block copolymer having a styrene content of 20 to 50% by weight, conducting an initial polymerization without causing phase transition in the first polymerization zone, and controlling a rubber particle size and a particle size distribution to specified ranges while causing phase transition by conducting polymerization in the second polymerization zone.

The present invention relates to a process for producing a rubber-modified styrene-based resin which comprises supplying a styrene-based monomer solution containing 5 to 20% by weight of a rubber component comprising a styrene-butadiene-based block copolymer having a styrene content of 20 to 50% by weight to a first polymerization zone where it is subjected to initial polymerization until the conversion reaches 10 to 30%, and then supplying the initial polymerization solution to a second polymerization zone where phase inversion is caused while at the same time increasing the conversion to 30 to 70% to thereby polymerize the monomer while controlling the rubber particle diameter to a range of 0.2 to 1.5 μm and a ratio of area average rubber particle diameter/number average rubber particle diameter (Ds/Dn) to less more than 2.5.

DETAILED DESCRIPTION OF THE INVENTION

A styrene-based monomer as one component of starting materials to be used in the present invention is styrene, or a mixture of styrene and a monomer copolymerizable therewith. Such copolymerizable monomers include aromatic monovinyl compounds such as α-methylstyrene, vinyltoluene, vinylethylbenzene, vinylxylene, p-tert-butylstyrene, α-methyl-p-methylstyrene and vinylnaphthalene, actylonitrile, methyl methacrylate, methyl acrylate, methacrylic acid, acrylic acid, maleic anhydride, and phenylmaleimide. These monomers can be used singly or in combination with one another. The amount of the copolymerizable monomer used is usually not more than 50% by weight and preferably not more than 40% by weight based on the total weight of the mixture containing styrene.

A rubber component as another component to be used in the present invention should be a styrene-butadiene-based block copolymer rubber having a styrene content of 20 to 50% by weight, preferably 25 to 45% by weight.

If the styrene content of the styrene-butadiene-based block copolymer rubber is less than 20% by weight, the conversion at which phase inversion occurs is decreased, the particle size in the initial polymerization becomes difficult to control, and as a result, the rubber particle size distribution is broadened and the gloss is decreased. On the other hand, if the styrene content is more than 50% by weight, the rubber particle size tends to be excessively decreased and thus the impact strength is decreased.

As the styrene-butadiene-based block copolymer rubber, both of a conventional diblock-type copolymer rubber and a tapered block-type copolymer rubber can be used. For example, a styrene-1,3-butadiene block copolymer rubber, a copolymer rubber resulting from replacement of part of the styrene repeating units in the above styrene-1,3-butadiene block copolymer rubber by a repeating unit of a monovinyl aromatic hydrocarbon copolymerizable with styrene, a copolymer rubber resulting from replacement of part of the 1,3-butadiene repeating units in the above styrene-butadiene block copolymer by a repeating unit of diolefin other than 1,3-butadiene, and a copolymer rubber resulting from replacement of the parts of the styrene repeating unit and the 1,3-butadiene repeating unit in the above styrene-butadiene block copolymer rubber by a repeating unit of monovinyl aromatic hydrocarbon copolymerizable with styrene and a repeating unit of diolefin other than 1,3-butadiene, respectively, can be used.

This styrene-butadiene block copolymer rubber can be produced, for example, by the following method. For example, a styrene-butadiene-based block copolymer rubber can be produced by the method as described in Japanese Patent Application Laid-Open No. 157493/1975 and Japanese Patent Publication No. 19031/1979.

That is, this block copolymer rubber can be produced in such a manner that styrene and 1,3-butadiene are copolymerized in the presence of an organolithium catalyst, in an inert hydrocarbon solvent such as hexane, heptane, benzene, and the like.

These styrene-butadiene-based block copolymer rubbers can be used singly or in combination with one another.

It is preferred that as the rubber component of the present invention, a styrene-butadiene-based copolymer rubber and polybutadiene rubber are used in combination. In this case, the proportion of polybutadiene rubber used is preferably not more than 50% by weight and particularly preferably not more than 40% by weight. If the proportion of the polybutadiene rubber used is more than 50% by weight, the conversion at which phase transition occurs is decreased, the particle size in the initial polymerization becomes difficult to control, and as a result, the rubber particle size distribution is readily broadened, and the gloss tends to be decreased.

As this polybutadiene rubber, various types of polybutadiene rubbers can be used. For example, so-called low cis polybutadiene rubber having a cis 1,4-content of 25 to 45% by weight as obtained by solution polymerization using a lithium-based catalyst, so-called high cis polybutadiene rubber having a cis 1,4-content of not less than 90% as obtained by solution polymerization using a Ziegler-type catalyst, and the like can be used.

These polybutadiene rubbers can be used singly or in combination with one another.

In the present invention, it is necessary that the above rubber component is dissolved in a styrene-based monomer in a range of 5 to 20% by weight. If the concentration of the dissolved rubber is less than 5% by weight, the impact strength of the resulting rubber-modified styrene-based resin is decreased. On the other hand, if the concentration of the dissolved rubber is more than 20% by weight, the viscosity of the polymerization system is greatly increased. This increase in the viscosity of the polymerization system needs a marked increase in power of a reactor, and readily produces troubles in operation, such as difficulty in removal of heat. Moreover, the stiffness of the resulting rubber-modified styrene-based resin is decreased, and cracks are produced at the time of molding.

A solution of the above rubber component in a styrene-based monomer is supplied to the first polymerization zone where initial polymerization is conducted until a conversion of 10 to 30% just before phase inversion is reached. If the conversion is less than 10%, the load for removal of heat in the second polymerization zone where phase inversion is caused is increased, and controlling temperature readily becomes difficult. On the other hand, if it is more than 30%, mixing is conducted only insufficiently because of high viscosity, and the molecular weight distribution is broadened.

A full mixing-vessel-type reactor is preferably used as a reactor to be used in the first polymerization zone for initial polymerization, but a stationary reactor in which the heat removal efficiency is increased by recycling can also be used.

In connection with the polymerization temperature in the first polymerization zone, when an organic peroxide is used for the polymerization, a temperature ranging between 20° C. and 200° C. is employed depending on the decomposition temperature of the organic peroxide, and in the case of thermal polymerization, a temperature ranging between 50° and 500° C. is employed.

If necessary, a chain transfer agent (molecular weight controlling agent), and antioxidant, a solvent, a mineral oil, a silicone oil, and so on can be added. When a chain transfer agent is added in the initial polymerization, a decrease in molecular weight and an increase in rubber particle diameter are attained at the same time depending on the amount added. When an organic peroxide is used, the rubber particle diameter can be narrowed.

Chain transfer agents which can be used include an α-methylstyrene dimer, mercaptans such as n-dodecylmercaptan, tert-dodecylmercaptan, 1-phenylbutene-2-fluorene, dipentene and chloroform, terpenes, and halogen compounds. Of these compounds, n-dodecylmercaptan is particularly preferred.

As organic peroxides, peroxyketals such as 1,1-bis(-tert-butylperoxy)cyclohexane, and 1,1-bis(tert-butylperoxy)-3,3,5-trimethylcyclohexane, dialkyl peroxides such as di-tert-butylperoxy 2,5-dimethyl-2,5-di(tert-butylperoxy)hexane, dialperoxides such as benzoylperoxide and m-toluoylperoxide, peroxydicarbonates such as dimyristyl-peroxydicarbonate, peroxyesters such as tert-butylperoxyisopropylcarbonate, ketoneperoxides such as cyclohexanoneperoxide, hydroperoxides such as p-mentahydroperoxide, and the like can be used.

In the polymerization of the present invention, a solvent may be used. Solvents which can be used include aromatic hydrocarbons such as toluene, xylene and ethylbenzene, and mixtures of two or more thereof. In addition, other solvents such as aliphatic hydrocarbons and dialkyl ketones can be used in combination with the aromatic hydrocarbon within a range that does not deteriorate the solubility of the polymerization product from the rubber component and the styrene-based monomer. The amount of the solvent used is suitably within the range of 0 to 25% by weight. If it is more than 25% by weight, the rate of polymerization tends to be markedly decreased, and the impact strength of the resulting rubber-modified styrene-based resin tend to be decreased. Moreover, the energy required for recovery of the solvent is increased, and thus production costs are increased. The solvent may be added after the polymerization conversion where the viscosity becomes relatively high is reached, or it may be added before polymerization. From the viewpoints of uniformity in quality and controlling the polymerization temperature, it is preferred that the solvent be added in an amount of 5 to 15% by weight before polymerization. In the first polymerization zone, the number of reactors used may be two or more depending on the scale of the apparatus.

In accordance with the present invention, the initial polymerization solution before phase inversion as withdrawn from the first polymerization zone is introduced into the second polymerization zone where phase transition is conducted to form particles having a rubber particle diameter of 0.2 to 1.5 μm and a area average rubber particle diameter/number average rubber particle diameter ratio (particle size distribution: Ds/Dn) of not more than 2.5, and furthermore the conversion is proceeded to 30 to 70%, thereby stabilizing rubber particles.

If the conversion is less than 30%, rubber particles are liable to be unstable because the system is at an inversion point of the phase inversion. On the other hand, if it is more than 70%, the viscosity is increased, and the resulting insufficient mixing broadens the rubber particle size distribution.

In order to control the above rubber particle diameter and particle size distribution, it is suitable that an average shear speed of 5 to 60 sec$^{-1}$ be applied in the second polymerization zone. If the average shear speed is less than 5 sec$^{-1}$, the heat removal is insufficient, and there is a danger that the run away reaction is caused. On the other hand, it is more than 60 sec$^{-1}$, it is necessary that the power of the reactor and the strength of the internal conduits be markedly increased.

The average shear speed ($\gamma$) is an index showing the strength of shear force in a place where the phase inversion is caused in the reactor. Depending on the strength, the rubber particle size is determined. Since the phase inversion phenomenon varies depending on the type of the reactor, the method of calculation is given depending on the type of the reactor.

For example, the phase inversion phenomenon occurs in the whole vessel in the case of the full mixing vessel-type reactor, while on the other hand in the case of the plug flow-type reactor, the phase inversion phenomenon occurs instantaneously at a point that a certain conversion is reached. Therefore, the average shear speed should be calculated as an average in the whole vessel in the former case, whereas in the latter case, the average shear speed should be calculated at a place where the system flows at the time of phase transition.

There is no absolute calculation formula, and the shear speed is determined experimentally. For the reactor used in the present invention, the following formula is used.

(1) Full Mixing Vessel $$\gamma = K_M \cdot n$$

$$K_M = 9.74 \left(\frac{D_t}{d} - 1\right)^{-0.25} \cdot \left(\frac{d}{D_t}\right)^{1.5}$$

where
- $\gamma$: average shear speed (sec$^{-1}$),
- n: number of rotations (rps),
- $K_M$: number of Metzner (—),
- $D_t$: vessel diameter (mm), and
- d: blade diameter (mm).

(2) Column-Type Reactor

Basically the average shear speed is given as an average of shear speeds given by the conduits, reactor walls, and agitation walls.

The shear speed of the reactor used in the present invention was calculated by the following experimental formula:

$$\gamma = \frac{A_1}{A_1 + A_2} \pi n d_{AVE}/C_1 + \frac{A_2}{A_1 + A_2} \pi n d/C_2$$

where
- $\gamma$: average shear speed (sec$^{-1}$),
- n: number of revolutions (rps),
- $d_{AVE}$: average blade diameter at a portion where it crosses with the conduit (mm),
- d: blade diameter (mm),
- $C_1$: clearance between the conduit and the blade (mm),
- $C_2$: clearance between the wall and the blade (mm),
- $A_1$: overlapped area between the conduit and the blade (m$^2$), and
- $A_2$: overlapped area between the wall and the blade (m$^2$).

(3) Tubular Reactor $$\gamma = u/C$$

where
- u: rate of flow in the tube (space column base m/s), and
- C: average clearance in the internal conduit (m).

For example, in the case of an SMR reactor (manufactured by Sumitomo Jukikai Kogyo Co., Ltd.), since the average clearance between the reactor wall and the conduits is 1.4 mm, the average shear speed is calculated by the following formula:

$$\gamma = 700 \cdot u,$$

The shape of rubber particle formed can be controlled appropriately from the one occulusion structure (in each rubber particle, the core is made of a styrene-based polymer, and the shell is made of a rubber-like polymer) to the racemic structure by the rubber mixing ratio, the method of applying the shear force, the chain transfer agent, and the amount of the catalyst added.

For example, by controlling the rubber particle diameter to 0.2 to 0.8 μm and the surface average rubber particle diameter/number average rubber particle diameter ratio to not more than 1.8, a rubber-modified styrene-based resin in which at least 80% of rubber particles have the one occulusion structure and which has excellent gloss can be produced.

If a column-type, or a plug flow-type such as tubular type is employed as the polymerization reactor to be used in the second polymerization zone, the rubber particle size distribution is expected to be more narrowed. For example, as the column-type reactor, a reactor which contains conduits for heat removal between multi-stage agitation blades and stages, and which has a column length/column diameter (L/D) of at least 3, for example, the known reactor described in Japanese Patent Application Laid-Open No. 1544/1957 can be employed.

As the tubular reactor, a reactor with L/D of at least 5, containing therein conduits for heat removal and mixing, e.g., an SMR reactor manufactured by Sumitomo Jukikai Kogyo Co., Ltd., a static mixer-including reactor manufactured by Noritake Co., or a himixer-including reactor manufactured by Toray Co., can be used.

When the above plug flow-type reactor is employed, only the molecular weight can be controlled without changing the rubber particle diameter by adding 50 to 1,500 ppm of a chain transfer agent in the inlet of the reactor.

The polymerization solution leaving the second polymerization zone where polymerization was conducted to a conversion of 30 to 70% is preferably introduced into the subsequent reactor where the conversion is increased to at least 70%. The polymerization solution thus obtained is freed from volatile matters and then pelletized using generally known apparatuses such as a flash drum, a di-screw evaporator, a thin film evaporator, and an extruder.

To the thus obtained rubber-modified styrene resin of the present invention can be added, if desired, various additives commonly used, such as a lubricant, e.g., stearic acid, behenic acid, zinc stearate, calcium stearate, magnesium stearate, or ethylenebisstealoamide, an antioxidant such as organic polysiloxane, mineral oil, or a hindered phenol-based antioxidant such as 2,6-di-tert-butyl-4-methylphenol, stearyl-$\beta$-(3,5-di-tert-butyl-4-hydroxyphenyl)propionate, or triethylene glycol-bis-3-(3-tert-butyl-4-hydroxy-5-methylphenyl)propionate, or a phosphorus-based antioxidant such as tri(2,4-di-tert-butylphenyl)phosphite or 4,4-butylidene(3-methyl-6-tert-butylphenyl-di-tridecyl)phosphite, and further a ultraviolet absorbing agent, a flame retardant, an anti-static agent, a releasing agent, a plasticizer, a dye, a pigment, various fillers, and so on can be added. In addition, other polymers such as polyphenylene ether can be compounded.

The rubber-modified styrene-based resin of the present invention is excellent in physical properties such as impact resistance, gloss, and stiffness, and thus is suitable as a material for production of OA equipments, home electric appliances, and car parts.

The process for production of rubber-modified styrene-based resin according to the present invention results in ease of removal of polymerization heat, reduced power for agitation, for example, and does not need a high strength apparatus. Moreover, the rubber-modified styrene-based resin obtained by the process of the present invention has a high impact strength, and excellent gloss and stiffness; that is, it is excellent in a physical property balance.

The present invention is described in greater detail with reference to the following examples.

Type and properties of rubbers used are shown in Table 1, and in Table 2, and type and shape of reactors used are shown.

EXAMPLE 1

SB block copolymer rubber, ZLS-01 (A-2 in Table 1), having a styrene content of 40 wt % as produced by Nippon Zeon Co., Ltd., and PB rubber, BR-15HB (B-1 in Table 1), as produced by Ube Kosan Co., Ltd. were dissolved in styrene in a concentration of 13 wt % in a weight ratio of 90:10.

18.0 l/hr of the above rubber solution and 1.8 l/hr of an ethylbenzene solution containing an antioxidant, Irganox 1076 (produced by Ciba Geigy Corp.), in an amount of 1,500 ppm based on the weight of the rubber solution were supplied to a full mixing vessel-type reactor (used as the first polymerization zone) with an inner volume of 21 l, and initial polymerization was conducted at a polymerization temperature of 137° C. to a styrene conversion of 20%.

The polymerization solution was then introduced into a full mixing vessel-type polymerization reactor (used as the second polymerization zone; corresponding to R-1 in Table 2) where it was polymerized with stirring at 145° C. at a number of revolutions of 120 rpm and a shearing speed of 48 sec$^{-1}$, to a conversion of 45%, while at the same time phase inversion was caused to control the rubber particle diameter.

The polymerization solution was introduced into a column-type polymerization reactor with multi-stage paddle blades, having the same shape as that of the second polymerization zone, where it was polymerized at a number of revolutions of 5 rpm and at a temperature of 155° C. to a conversion of 75%.

The final polymerization solution was sent to the evaporation step where volatile matters were removed with a flash drum in vacuum, and it was pelletized with an extruder provided thereto.

Rubber particle shape and physical properties of the product obtained were evaluated, and the results are shown in Table 3. The product was excellent in gloss and impact characteristics.

EXAMPLE 2

The procedure of Example 1 was repeated with the exception that as the second polymerization zone, a column-type reactor (plug flow), R-2 in Table 2, was used, and polymerization was conducted with stirring at a number of revolutions of 60 rpm and a shearing speed of 48 sec$^{-1}$. The polymerization solution in the second polymerization zone was in the plug flow. The results are shown in Table 3. The rubber particle size distribution was narrowed, and gloss was more increased.

Comparative Example 1

The same starting materials as used in Example 1 were used. The amount of each material supplied was decreased to $\frac{2}{3}$ times the original. They were supplied directly to the same second polymerization zone as in Example 1 without passing through the first polymerization zone, where polymerization was conducted to a conversion of 45% while at the same time the rubber particle size was formed by phase transition. Thereafter, in the same manner as in Example 1, pellets were obtained and evaluated. The results are shown in Table 3. The particle size distribution was broadened and gloss was markedly decreased.

Comparative Example 2

Using the same process and rubber as in Example 1, the procedure was attempted to conduct in such a manner that the conversion at the outlet of the first polymerization zone was 35%, and in the second polymerization zone, the conversion was 55% at a number of revolutions of 60 rpm. However, the difference in temperature between the jacket and the inner temperature was increased, and the operation became impossible.

EXAMPLE 3

SB block rubber, BL-6533 (A-1 in Table 1), as produced by Bayer Co., and PB rubber, BR-15HB (B-1 in Table 1), as produced by Ube Kosan Co., Ltd., were dissolved in styrene in a ratio of 80:20 and in a concentration of 15 wt %. The solution thus obtained was supplied to the process as in Example 2 and at the flow rate as in Example 2. In the second polymerization zone, polymerization was conducted at a number of revolutions of 40 rpm and while stirring at a shearing speed of 32 sec$^{-1}$ to a conversion of 50%. Thereafter, the procedure of Example 2 was repeated with the exception that the final conversion in the subsequent polymerization reactor was set to 80%. The results are shown in Table 3.

EXAMPLE 4

The operation was conducted under the same conditions as in Example 3 except that the conversion balance in the outlet of the polymerization reactor in each polymerization zone was set to 12%, 40% and 70%. The results are shown in Table 3.

Comparative Example 3

The operation was conducted under the same conditions as in Example 3 except that the conversions in the outlet of each polymerization zone were set to 8%, 27% and 65%, respectively. The results are shown in Table 3.

EXAMPLE 5

Only the same SB rubber as in Example 3 was dissolved in styrene in a concentration of 18 wt %. Under the same conditions in respect of amount to be supplied and conversion, the operation was conducted in the same manner as in Example 3 except that only the stirring conditions in the polymerization reactor in the second polymerization zone were changed to a number of revolutions of 10 rpm and a shearing speed of 7 sec$^{-1}$. The results are shown in Table 3.

EXAMPLE 6

The same rubbers as used in Example 3 were dissolved in styrene in a concentration of 7 wt % in a mixing ratio of 60:40. According to the same process as in Example 3, the operation was conducted in such a manner that the conversions in the polymerization reactors in the first and second polymerization zones, and the conversion in the subsequent polymerization reactor were set to 15%, 50% and 75%, respectively, and that in connection with stirring conditions in the second polymerization zone, the number of revolutions was 70 rpm and the shearing speed was 56 sec$^{-1}$. The results are shown in Table 3.

EXAMPLE 7

The rubbers were dissolved in styrene in a rubber concentration of 13 wt % in the same mixing ratio as in Example 6. The rubber particle diameter was increased by operating under the same conditions as in Example 6 in respect of amount to be supplied and conversion, and in the second polymerization zone, under such conditions that the number of revolution was 40 rpm and the shearing speed was 32 sec$^{-1}$. The results are shown in Table 3.

Comparative Example 4

The same rubbers as used in Example 3 were dissolved in a concentration of 15% by weight at a mixing ratio of 40:60. According to the same process as in Example 3, the conversions in the reactors in the first and second polymerization zones, and in the subsequent reactor were set to 20%, 50%, and 80%, respectively. In connection with the stirring conditions in the second polymerization zone, the number of revolutions was 40 rpm, and the shearing speed was 32 sec$^{-1}$. The results are shown in Table 3. The particle diameter was increased and the particle size distribution was broadened, and thus gloss was decreased.

Comparative Example 5

Only the same SB rubber as used in Example 5 was dissolved in styrene in a concentration of 22% by weight. The amount supplied and the conversion were the same as in Example 5. In connection with stirring conditions in the second polymerization zone, the number of revolutions was 10 rpm, and the shearing speed was 7 sec$^{-1}$. As a result, the difference between the inner temperature of the second polymerization zone and the temperature of the jacket was increased by an increase in the viscosity of the system, and controlling became impossible.

Comparative Example 6

The same rubbers as used in Example 6 were dissolved in styrene in a concentration at the same mixing ratio as in Example 6. In the same process as in Example 6, the amount supplied and the conversion were the same. In connection with stirring conditions, the number of revolutions was 90 rpm, and the shearing speed was 66 sec$^{-1}$. The results are shown in Table 3. As a result of a decrease in the rubber concentration of the product, a weight drop-impact strength was no exhibited.

Comparative Example 7

SB rubber was replaced by A-3 in Table 1, and it was dissolved in styrene in a concentration of 15% by weight at the same mixing ratio as in Example 3. According to the same process as in Example 3, the operation was conducted under the same amount supplied and number of rotations as in Example 3, but with regard to the stirring conditions in the second polymerization zone, at a number of revolutions of 20 rpm and a shear speed of 16 sec$^{-1}$. As a result, the particle diameter was increased and the particle diameter distribution was broadened, and thus gloss was decreased.

Comparative Example 8

Only the SB rubber of A-4 in Table 1 was used and dissolved in a concentration of 15% by weight. The operation was conducted according to the same process as in Example 3, under the same conditions as in Example 3 in connection with the amount supplied and the conversion, and in connection with the stirring conditions in the second polymerization zone, at a number of revolutions of 6 rpm and a shear speed of 4 sec$^{-1}$. Under this low shear, the particle diameter was made extremely fine, and the impact strength was not exhibited. The results are shown in Table 3.

Comparative Example 9

The same rubbers as in Example 5 were dissolved in the same concentrations in Example 5. According to the same process as in Example 5, the operation was conducted under the same stirring conditions as in Example 5 except that the conversion in the first polymerization reactor was changed to 8%. As a result, the difference between the inner temperature of the upper part of the first polymerization reactor and the temperature of the jacket was increased, and controlling became impossible.

EXAMPLE 8

The same rubbers as in Example 5 were dissolved in the same concentration as in Example 5. The amount supplied was the same as in Example 5, and the operation was conducted with the replacement of R-2 by R-3 (plug flow type) in Table 2. In order to control the shear speed to 8 sec$^{-1}$, the polymerization solution was recycled at 310 l/hr by the use of a gear pump. The conversions in the polymerization reactors in the first and second polymerization zones, and in the outlet of the subsequent polymerization reactor were 30%, 45%, and 75%, respectively. The results are shown in Table 3.

EXAMPLE 9

The same rubbers as in Example 8 were dissolved in a concentration of 18% by weight at a mixing ratio of 90:10, and the same operation as in Example 8 was conducted. However, to control the shear speed to 15 sec$^{-1}$, the polymerization solution was recycled at 580 l/hr. The results are shown in Table 3.

Comparative Example 10

The same rubbers as in Example 8 were dissolved in a concentration of 15% by weight at a mixing ratio of 70:30, and the same operation as in Example 8 was conducted. However, to control the shear speed to 2 sec$^{-1}$, the polymerization solution was recycled at 78 l/hr. The results are shown in Table 3. The particle diameter was increased, and the gloss was decreased.

EXAMPLE 10

The operation was conducted under the same conditions as in Example 3 except that a chain transfer agent, n-dodecyl mercaptan, was introduced into the second polymerization zone as an ethylbenzene solution in a proportion of 200 ppm based on the weight of the rubber solution. As a result, only the molecular weight could be decreased without changing the rubber particle diameter, and thus fluidity could be improved without changing physical properties. Evaluation results are shown in Table 3.

EXAMPLE 11

The operation was conducted under the same conditions as in Example 10 except that the amount of the chain transfer agent added was increased to 1,200 ppm. The results are shown in Table 3.

EXAMPLE 12

The operation was conducted under the same conditions as in Example 10 except that only the position at which the chain transfer agent was to be supplied was changed to the first polymerization zone. The results are shown in Table 3.

EXAMPLE 13

The operation was conducted under the same conditions as in Example 7 except that the organic peroxide, 1,1-bis(tertbutylperoxy)-3,3,5-trimethylsiloxane, was supplied to the first polymerization zone as an ethylbenzene solution in an amount of 200 ppm based on the weight of the rubber solution. The results are shown in Table 3.

EXAMPLE 14

The operation was conducted in the same manner as in Example 2 except that two full mixing-type polymerization reactors having an inner volume of 10 liters were used as the first polymerization zone, and initial polymerization was conducted at a polymerization temperature of 135° C. to a styrene conversion of 10% in the first polymerization reactor, and then in the second polymerization reactor, at a polymerization temperature of 139° C. to a styrene conversion of 20%. The results are shown in Table 3.

Measurement of Physical Properties

Physical properties were evaluated by the following methods.

(1) Gloss

Measured according to JIS K-7105.

(2) Izod Impact Strength

Measured according to JIS K-7110 (23° C., notched).

(3) Flexural Modulus

Measured according to ASTM-D-790.

(4) Drop-Weight Impact Strength

The energy until an abrupt decrease in force was first observed in a force-displacement curve was determined by the use of a Rheometrics automatic falling weight impact tester RDT 5000 at a point 125 mm from a gate position of a 270×70×3 mm injection molded plate and at the center of the plate width (700 mm) under conditions of load 3.76 kg, speed 3.5 m/sec, pore diameter of the specimen fixed point 2 inch, and temperature 23° C., and was indicated as a falling weight impact strength.

(5) Weight Average Molecule Weight (Mw)

0.2 g of a sample was dissolved in 40 ml of tetrahydrofuran (THF), and a gel portion was separated with a millipore filter. The weight average molecular weight was measured with GPC manufactured by Waters Corp.

(6) Measurement of Average Rubber Particle Diameter and Particle Diameter Distribution A sample obtained by slicing a resin by the thin film slicing method was photographed by the use of a transmission electron microscope (10,000x magnification). About 1,000 dispersed particles in the photograph were measured for diameter. Since, however, dispersed particles in the electron microscopic photograph were not completely circle, a diameter in the longitudinal direction (a) and a diameter in the width direction (b) were measured, and the particle diameter was calculated from the following equations.

$$\text{Particle Diameter} = \sqrt{a \times b}$$

$$\text{Average Rubber Particle Diameter } Ds = \frac{\Sigma n_i D_i^3}{\Sigma n_i D_i^2}$$

-continued

In the above equations, $n_i$ indicates the number of dispersed particles having a diameter of $D_i$.

TABLE 1

| No. | Type | Name of Rubber | Maker | Type of Block Copolymer Rubber | Total[1] Amount of Styrene (wt %) | Amount of Block Styrene (wt %) | Viscosity[2] of Solution (cp) | Remarks |
|---|---|---|---|---|---|---|---|---|
| A-1 | SB | BL-6533 | Bayer | Tapered Block-type | 40 | 30 | 35 | |
| A-2 | SB | ZLS-01 | Nippon Zeon | Conventional diblock-type | 22 | 22 | 10 | |
| A-3 | SB | Synthetic Product (1) | — | Conventional diblock-type | 10 | 10 | 30 | Used in Com. Ex. |
| A-4 | SB | Synthetic Product (2) | — | Conventional diblock-type | 55 | 55 | 24 | Used in Com. Ex. |
| B-1 | PB | BR-15HB | Use Kosan | — | — | — | 63 | |

[1]Total Amount of Styrene: Measured with a JNM-FX200 nuclear magnetic resonance apparatus (manufactured by Nippon Denshi Corp.) in chloroform as a solvent at room temperature and at $^{13}$C:50.1 MHz.
[2]Viscosity of Solution: Viscosity of a 5% styrene solution at 25° C. (centipoises).

TABLE 2

| | Reactor | | | | | Stirring Blade | | | | |
|---|---|---|---|---|---|---|---|---|---|---|
| | | | | | | | | Clearance (mm) | | |
| No. | Type | Volume (l) | Vessel Diameter (D) (mm) | Vessel Height (L) (mm) | L/D | Type | Blade Diameter (mm) | Vessel Wall Surface | Conduit | Remarks |
| R-1 | Full mixing vessel | 23 | 298 | 372 | 1.25 | Double helical | 291 | 3.5 | — | |
| R-2 | Column-type reactor | 33 | 200 | 1260 | 6.3 | Multi-stage paddle blade | 190 | 5.0 | 11.0 | Blade area[2] $A_1 = 0.0104$ $A_2 = 0.0042 m^2$ |
| R-3 | SMR-type reactor | 10 | 87[1] | 1440 | 16.6 | Static mixer | Conduits: 10 × 8 lines | | | Containing static mixer type conduits in the inside |

[1]Cross section 87 × 87 square
[2]$A_1$: Crossed area between conduit and blade
$A_2$: Crossed area between reactor wall surface and blade $$\text{Average Diameter Distribution } Ds/Dn = \frac{\Sigma n_i D_i^3 / \Sigma n_i D_i^2}{\Sigma n_i D_i / \Sigma n_i}$$

TABLE 3

| No. | SB Rubber Type | SB Rubber Mixing ratio | PB Rubber Mixing Ratio | Solution Concentration (wt %) | Initial Polymerization Conversion (%) | Phase Inversion Reactor Reactor | Number of Revolution (rpm) | Shear Speed (sec$^{-1}$) | Conversion (%) | Amount of Chain Transfer Agent Added (ppm) |
|---|---|---|---|---|---|---|---|---|---|---|
| Example 1 | A-2 | 90 | 10 | 13 | 20 | R-1 | 120 | 48 | 45 | 0 |
| Example 2 | A-2 | 90 | 10 | 13 | 20 | R-2 | 60 | 48 | 45 | 0 |
| Example 3 | A-1 | 80 | 20 | 15 | 20 | R-2 | 40 | 32 | 50 | 0 |
| Example 4 | A-1 | 80 | 20 | 15 | 12 | R-2 | 40 | 32 | 40 | 0 |
| Example 5 | A-1 | 100 | 0 | 18 | 20 | R-2 | 10 | 7 | 50 | 0 |
| Example 6 | A-1 | 60 | 40 | 7 | 15 | R-2 | 70 | 56 | 50 | 0 |
| Example 7 | A-1 | 60 | 40 | 13 | 15 | R-2 | 40 | 32 | 50 | 0 |
| Example 8 | A-1 | 100 | 0 | 18 | 30 | R-3 | — | 8 | 45 | 0 |
| Example 9 | A-1 | 90 | 10 | 18 | 30 | R-3 | — | 15 | 45 | 0 |
| Example 10 | A-1 | 80 | 20 | 15 | 20 | R-2 | 40 | 32 | 50 | 200 |
| Example 11 | A-1 | 80 | 20 | 15 | 20 | R-2 | 40 | 32 | 50 | 1200 |
| Example 12 | A-1 | 80 | 20 | 15 | 20 | R-2 | 40 | 32 | 50 | 200[1] |
| Example 13 | A-1 | 60 | 40 | 13 | 20 | R-2 | 40 | 32 | 50 | 0 |
| Example 14 | A-2 | 90 | 10 | 13 | 10/20 | R-2 | 60 | 48 | 45 | 0 |
| Comparative Example 1 | A-2 | 90 | 10 | 13 | 0 | R-1 | 120 | 48 | 45 | 0 |
| Comparative Example 2 | A-2 | 90 | 10 | 13 | 35 | R-1 | 60 | 24 | Temperature controlling became impossible, and operation became impossible. | |
| Comparative Example 3 | A-1 | 80 | 20 | 15 | 8 | R-2 | 40 | 32 | 27 | 0 |
| Comparative Example 4 | A-1 | 40 | 60 | 15 | 20 | R-2 | 40 | 32 | 50 | 0 |
| Comparative Example 5 | A-1 | 100 | 0 | 22 | 20 | R-2 | 10 | 7 | Temperature controlling became impossible, and operation became impossible. | |
| Comparative Example 6 | A-1 | 60 | 40 | 4 | 20 | R-2 | 90 | 66 | 50 | 0 |
| Comparative Example 7 | A-3 | 60 | 40 | 15 | 20 | R-2 | 20 | 16 | 50 | 0 |

TABLE 3-continued

| | | | | | | | | | |
|---|---|---|---|---|---|---|---|---|---|
| Comparative Example 8 | A-4 | 100 | 0 | 15 | 20 | R-2 | 6 | 4 | 50 | 0 |
| Comparative Example 9 | A-1 | 100 | 0 | 18 | 8 | R-2 | 8 | 7 | Temperature controlling became impossible, and operation became impossible. | |
| Comparative Example 10 | A-1 | 70 | 30 | 15 | 30 | R-3 | — | 2 | 50 | 0 |

| | | Shape of Rubber | | Physical Properties | | | | |
|---|---|---|---|---|---|---|---|---|
| No. | Final Conversion (%) | Particle Diameter (μm) | Distribution Ds/Dn | Glose (%) | Izod Impact Strength (kg-cm/cm) | Drop Weight Strength (J) | Flexural Modulas (kg/cm²) | Molecular Weight (Mw) |
| Example 1 | 75 | 0.56 | 2.3 | 90 | 12.5 | 10 | 22200 | 223,000 |
| Example 2 | 75 | 0.52 | 1.6 | 94 | 12.2 | 10 | 22600 | 223,000 |
| Example 3 | 80 | 0.50 | 1.8 | 94 | 13.5 | 21 | 20100 | 202,000 |
| Example 4 | 70 | 0.51 | 1.8 | 94 | 17.2 | 23< | 18700 | 230,000 |
| Example 5 | 80 | 0.32 | 1.4 | 97 | 9.0 | 5 | 20400 | 195,000 |
| Example 6 | 75 | 0.65 | 1.9 | 92 | 9.5 | 5 | 23500 | 220,000 |
| Example 7 | 75 | 1.25 | 2.0 | 88 | 18.5 | 23< | 19100 | 224,000 |
| Example 8 | 75 | 1.45 | 1.7 | 95 | 13.2 | 10 | 19600 | 218,000 |
| Example 9 | 75 | 0.75 | 1.8 | 91 | 17.5 | 18 | 18600 | 218,000 |
| Example 10 | 80 | 0.52 | 1.6 | 94 | 13.8 | 20 | 19800 | 178,000 |
| Example 11 | 80 | 0.53 | 1.6 | 94 | 11.8 | 12 | 19600 | 141,000 |
| Example 12 | 80 | 0.75 | 1.7 | 91 | 14.5 | 18 | 19400 | 176,000 |
| Example 13 | 80 | 0.48 | 2.0 | 95 | 13.6 | 15 | 20100 | 204,000 |
| Example 14 | 75 | 0.52 | 1.5 | 94 | 12.0 | 10 | 22500 | 230,000 |
| Comparative Example 1 | 75 | 0.63 | 2.8 | 82 | 12.4 | 11 | 21400 | 234,000 |
| Comparative Example 2 | Temperature controlling became impossible, and operation became impossible. | | | | | | | |
| Comparative Example 3 | 65 | 2.1 | 2.6 | 60 | 17.4 | 20 | 17800 | 241,000 |
| Comparative Example 4 | 80 | 1.80 | 2.9 | 62 | 16.4 | 12 | 18900 | 211,000 |
| Comparative Example 5 | Temperature controlling became impossible, and operation became impossible. | | | | | | | |
| Comparative Example 6 | 80 | 0.92 | 2.2 | 82 | 10.5 | 0.1 | 25500 | 202,000 |
| Comparative Example 7 | 80 | 2.3 | 2.7 | 54 | 17.8 | 10 | 21600 | 196,000 |
| Comparative Example 8 | 80 | 0.15 | 1.4 | 98 | 1.2 | 0.1> | 26200 | 203,000 |
| Comparative Example 9 | Temperature controlling became impossible, and operation became impossible. | | | | | | | |
| Comparative Example 10 | 80 | 1.7 | 2.0 | 72 | 16.5 | 23< | 18600 | 198,000 |

[1] The chain transfer agent was supplied to the first stage.
Example 13: 200 ppm of the catalyst was added.

What is claimed is:

1. A process for producing a rubber-modified styrene-based resin which comprises supplying a styrene-based monomer solution containing 5 to 20% by weight of a rubber component comprising a styrene-butadiene-based block polymer rubber with a styrene content of 20 to 50% by weight to a first polymerization zone where initial polymerization is conducted to a conversion of 10 to 30%, and then supplying the resulting initial polymerization solution to a second polymerization zone where polymerization is conducted to a conversion of 30 to 70% while at the same time phase inversion is caused, thereby controlling a rubber particle diameter to a range of 0.2 to 1.5 μm and area average rubber particle diameter/number average rubber particle diameter ratio (Ds/Dn) to not more than 2.5.

2. The process as claimed in claim 1, wherein the rubber component comprises a styrene-butadiene-based block copolymer rubber with a styrene content of 20 to 50% by weight and not more than 50% by weight of polybutadiene.

3. The process as claimed in claim 1 or 2, wherein the second polymerization zone is a plug flow-type reactor with a length/diameter ratio (L/D) of at least 3.

4. The process as claimed in claim 3, wherein the plug flow type reactor is a column-type reactor provided with multi-stage stirring blades, or a tubular reactor provided with a static mixer and a conduit in the inside thereof.

5. The process as claimed in claim 1, which further comprises supplying 50 to 1,500 ppm of a chain transfer agent to the second polymerization zone.

6. The process as claimed in claim 1, wherein an average shear speed in the second polymerization zone is from 5 to 60 sec$^{-1}$.

7. The process as claimed in claim 2, wherein an average shear speed in the second polymerization zone is 5 to 60 sec$^{-1}$.

8. The process as claimed in claim 7, wherein the styrene content is 25 to 45% by weight.

9. The process as claimed in claim 8, wherein the styrene-butadiene-based block copolymer is a styrene-1,3-butadiene block copolymer.

10. The process as claimed in claim 9, wherein the rubber component further comprises polybutadiene rubber in an amount of not more than 50 weight %.

11. The process as claimed in claim 10, wherein the amount of the polybutadiene rubber is not more than 40 weight % and the polybutadiene rubber has a cis 1,4-content of 25 to 45% by weight.

12. The process as claimed in claim 11, wherein an organic peroxide is present in the first polymerization zone and the initial polymerization is carried out at a temperature of 20° C. to 200° C.

13. The process as claimed in claim 12, wherein the organic peroxide is selected from the group consisting of 1,1-bis-(tert-butylperoxy) cyclohexane, 1,1-bis(tert-butylperoxy)-3,3,5-trimethylcyclohexane, benzoylperoxide, m-toluoylperoxide, dimyristyl-peroxydicarbonate, tert-butylperoxyisopropropylcarbonate, cyclohexanone peroxide, and p-pentahydroperoxide.

14. The process as claimed in claim 11, wherein a thermal polymerization is carried out at a temperature of 50° C. to 500° C. in the first polymerization zone.

15. The process as claimed in claim 11, which further comprises carrying out the initial polymerization in the presence of a chain transfer agent selected from the group consisting of an α-methylstyrene dimer, n-dodecylmercaptan, tert-dodecylmercaptan, 1-phenyl-butene-2-fluorene, dipentene, chloroform, terpenes and halogen compounds.

16. The process as claimed in claim 11, which further comprises providing 5 to 15% by weight of a solvent before polymerization, said solvent being selected from the group consisting of at least one of toluene, xylene, ethyl-benzene, an aliphatic hydrocarbons and a dialkyl ketone.

* * * * *